(12) United States Patent
Azgin et al.

(10) Patent No.: US 11,102,118 B2
(45) Date of Patent: Aug. 24, 2021

(54) SYSTEM AND METHOD FOR SUPPORTING ICN-WITHIN-IP NETWORKING

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 25 days.

(21) Appl. No.: 15/928,575

(22) Filed: Mar. 22, 2018

(65) Prior Publication Data
US 2019/0297014 A1    Sep. 26, 2019

(51) Int. Cl.
| | | |
|---|---|---|
| *H04L 12/749* | (2013.01) | |
| *H04L 12/741* | (2013.01) | |
| *H04L 29/12* | (2006.01) | |
| *H04L 12/743* | (2013.01) | |
| *H04L 12/935* | (2013.01) | |
| *H04L 12/747* | (2013.01) | |

(52) U.S. Cl.
CPC ............ *H04L 45/741* (2013.01); *H04L 45/54* (2013.01); *H04L 45/742* (2013.01); *H04L 45/7453* (2013.01); *H04L 49/3009* (2013.01); *H04L 61/103* (2013.01)

(58) Field of Classification Search
CPC ..... H04L 61/103; H04L 45/741; H04L 45/54; H04L 45/742; H04L 45/7453; H04L 49/3009
See application file for complete search history.

(56) References Cited

U.S. PATENT DOCUMENTS

| | | | | |
|---|---|---|---|---|
| 2003/0231629 | A1* | 12/2003 | Banerjee | ............. H04L 12/1859 370/390 |
| 2009/0287835 | A1* | 11/2009 | Jacobson | ............. H04L 67/1068 709/229 |
| 2018/0103128 | A1* | 4/2018 | Muscariello | ........... H04L 45/745 |
| 2018/0241669 | A1* | 8/2018 | Muscariello | ........ H04L 63/0807 |
| 2019/0158456 | A1* | 5/2019 | Surcouf | ................... H04L 67/02 |

* cited by examiner

*Primary Examiner* — Kevin C. Harper
*Assistant Examiner* — Derrick V Rose
(74) *Attorney, Agent, or Firm* — Schwegman Lundberg & Woessner, P.A.

(57) ABSTRACT

An ICN-over-IP architecture, which supports ICN-dependent IP addresses, is provided as an integrated architecture requiring small changes within the network, utilizing the incrementally introduced ICN-enabled IP routers efficiently where ICN-enabled IP routers are distributed within/across domains and are capable of coordinating among others based on domain or ICN imposed policies. System, devices and methods are provided achieving improved performance with the introduction of additional ICN-enabled IP routers within/across domains, and continuing to perform efficiently by relying on the principles of the current IP forwarding and taking advantage of IP's currently available features.

24 Claims, 11 Drawing Sheets

SYSTEM AND METHOD FOR SUPPORTING ICN-WITHIN-IP NETWORKING

TECHNICAL FIELD

The present disclosure relates generally to networking architecture and data communication and more particularly to integration of information centric networking (ICN) within IP-based networking infrastructure.

BACKGROUND

Internet Protocol (IP) is a communications protocol that provides for identification and location of devices on networks and routes traffic across the Internet. IP version 6 (IPv6) is the most recent version of IP which is slated to replace current widely used IP version 4 (IPv4).

ICN has been proposed as a future networking architecture to support content-centric or name-based forwarding by evolving the current host-centric model of IP to address the future networking challenges created by billions of content producers or publishers and evolving user needs/trends. ICN introduces many novel features and integrates them within its architecture, such as, name-based routing, in-network caching, stateful forwarding, packet-based security, while also providing inherent support for multicasting, multi-homing and mobility. However, current implementation proposals for ICN are typically limited in scope, as ICN requires higher level of support from service providers to fully integrate ICN at a global scale, which is a costly and time consuming process. As a result, current approaches typically target overlay-based designs to run over the current IP, which even though illustrates ICN's basic advantages over IP, is still limited in terms of integration capability and its overall impact.

SUMMARY

To enable faster integration of ICN within the current IP-based networking infrastructure, solutions are needed that address the incremental integration of ICN within IP. Illustrative embodiments of the disclosure address at least the above problems and/or disadvantages, and provide at least the advantages described below.

Illustrative embodiments of the disclosure provide systems and methods including an architecture having a producer domain and a consumer domain and using a locator and content identifier, for example an anycast-ICN-identifier (ID) and/or ICN-router-ID as locator and a flat ID such as name-hash, or a hash-based name, as content-ID. Exemplary implementations depend on the forwarding scenario, for instance, whether the packet is forwarded within consumer's domain, within producer's domain, or in-between consumer-and-producer domains. In exemplary implementations, architecture supports stateful, semi-stateful, and stateless forwarding where stateful forwarding is achieved by swapping source/destination addresses and storing the information on them to traceback the route back to the requesting host, semi-stateful forwarding is achieved by keeping states at the first/last content routers, for example ICN-enabled IP routers which are capable of understanding ICN logic and performing ICN functions, and stateless forwarding is achieved, for example by aggregating domain/ICN-router-Identifiers to create reverse-path information within packet headers as an ICN-specific IPv6 extension header.

According to one aspect of the present disclosure there is provided a system for providing forwarding in a network by supporting information-centric networking within internet protocol networking that includes a producer configured to generate and transmit a content and a consumer that can make a request for the content. The producer has a namespace and an address, and configured within the producer's domain are one or more routers in communication with the producer and one or more servers in communication with the router(s). Configured within the consumer's domain are one or more routers for processing the consumer's request for content and one or more servers in communication with the router(s) in the consumer domain and the server(s) in the producer domain. The system includes a registration, routing and resolution logic including memory storing computer readable instructions and one or more processors coupled to the memory.

When the registration, routing and resolution logic executes the computer readable instructions, it is configured to assign the namespace of the producer to an assigned IP address comprising an IP address of the router in the producer domain, or to a common anycast IP address shared by one or more routers within the producer domain. An entry comprising the producer namespace, the assigned IP address and the producer address is stored in the memory of the producer domain server in a database shareable with the consumer domain server. A mapping of the producer address to the namespace of the producer is distributed to one or more routers in the producer domain.

When request for content is made, the registration, routing and resolution logic executes the computer readable instructions, for example to set a destination address of the consumer's request for the content as a default information-centric network address, while setting a routing extension header to a known address of a router, or to a known address of a server, within its domain. If the preferred destination address for the producer is known, the destination address of the consumer's request for the content can be set as a destination address of the known producer.

If the request for the content does not include the producer address, but the router receiving the consumer's request has the mapping for the producer namespace, the destination address can be updated with the producer address, or address of a router in the producer domain, based on the mapping before forwarding the request. If the request for the content does not include the producer address and the router does not have the mapping for the producer namespace, the destination address can be obtained by communicating with the consumer domain server that can obtain, and share with the consumer domain router, the mapping based on communication with the producer domain server, which has the entry comprising the namespace, the assigned IP address and the producer address stored in its memory. If the server does not have the mapping, then IP address related to content namespace can be discovered, for example by a hierarchical name resolution system or a distributed name resolution system.

After the mapping for the producer namespace has been determined, it is shared with the router within the consumer domain. Then, the request is forwarded to an IP address corresponding to the content namespace mapping, which in an exemplary implementation is an address of a router within the producer domain. In a further exemplary implementation, the request can be cached by any ICN-enabled router.

At the producer domain router, the producer address corresponding to the namespace is extracted, and the request is updated with the IP address of the producer domain router. If the requested content is not cached at the producer domain router, then the request is sent to producer to obtain the requested content, which is then returned to the consumer.

According to another aspect of the present disclosure there is provided a method for providing forwarding in a network by supporting information-centric networking within internet protocol networking, that includes: assigning a namespace of the producer to an assigned IP address comprising an IP address of an ICN-enabled router in the producer domain, or to a common anycast IP address shared by the ICN-enabled routers within the producer domain; storing an entry comprising the namespace, the assigned IP address and a producer address in a memory of a producer domain server in a database shareable with the consumer domain server; and distributing to the producer domain router a mapping of the producer address to the namespace of the producer.

Optionally, according to any of the preceding aspects of the disclosure, where a consumer domain router and a consumer domain server reside and operate in a domain of the consumer, the method of the disclosure further comprises setting, when a request for content is made, a destination address of the consumer's request for the content, as a default information-centric network address, while setting a routing extension header to a known address of a router, or to a known address of a server, within its domain. If the preferred destination address for the producer is known, the destination address of the consumer's request for the content can be set as a destination address of the known producer.

Optionally, according to any of the preceding aspects of the disclosure, where the request for the content does not include the producer address, the method of the disclosure further comprises, if the consumer domain router has the mapping, updating the destination IP address with the producer address based on the mapping before forwarding the request, or, if the consumer domain router does not have the mapping, communicating with the consumer domain server to get the preferred destination address based on the entry stored in the database in the memory of the producer domain server.

Optionally, according to any of the preceding aspects of the disclosure, after the mapping for the producer namespace has been determined, the method of the disclosure comprises sharing the mapping with the router within the consumer domain and forwarding the request for content to an address corresponding to the IP address of the router within producer domain. In a further exemplary implementation, the method of the disclosure comprises caching the request by any ICN-enabled router.

Optionally, according to any of the preceding aspects of the disclosure, the method comprises extracting the producer address corresponding to the namespace at the producer domain router, and updating the request with the IP address of the producer domain router. If the requested content is not cached at the producer domain router, then, according to an exemplary implementation of the method of the disclosure, the request is sent to producer to obtain the requested content, which is then returned to the consumer.

Optionally, in any of the preceding aspects of the disclosure, one or more of the routers are information-centric network-enabled routers, and/or any one or more of the servers are information-centric network-enabled mapping servers.

Optionally, in any of the preceding aspects of the disclosure, the registration, routing and resolution logic when executing the computer readable instructions is further configured to translate a content identifier comprising the namespace to a translated IP address.

Optionally, in any of the preceding aspects, translated IP address comprises: a 32-bit or 24-bit information-centric networking identifier; a 48-bit identifier of said publisher of the content; and a 48-bit identifier of the content derived by using cryptographic hash.

Optionally, in any of the preceding aspects, translated IP address comprises: a 32-bit information-centric networking identifier; a 32-bit identifier of the publisher of the content; and a 64-bit identifier of the content derived by using cryptographic hash.

Optionally, in any of the preceding aspects, translated IP address comprises: a 32-bit information-centric networking identifier; and a 96-bit identifier of the content.

Optionally, in any of the preceding aspects, the request forwarded to the address corresponding to the IP address of the producer domain router is cached by the producer domain router and available for retrieval from the producer domain router.

Optionally, in any of the preceding aspects, if the consumer domain server in communication with the producer domain server does not have the mapping toward the namespace indicated within a consumer request, then the consumer domain server in communication with the producer domain server discover the mapping by employing a hierarchical name resolution system going through upper levels until a match is found, or a distributed name resolution system to discover an IP address related to the namespace Optionally, in any of the preceding aspects, the registration, routing and resolution logic when executing the computer readable instructions is further configured to assign K-bit hash addresses to names of the content using cryptographic hash functions.

BRIEF DESCRIPTION OF THE DRAWINGS

The above and other exemplary features, aspects and advantages of the disclosure will become more apparent from the following detailed description of illustrative embodiments thereof when taken in conjunction with the accompanying drawings in which.

DETAILED DESCRIPTION OF ILLUSTRATIVE EMBODIMENTS

This description is provided to assist with a comprehensive understanding of illustrative embodiments with reference to the accompanying drawing figures. Accordingly, those of ordinary skill in the art will recognize that various changes and modifications of the illustrative embodiments described herein can be made within the scope of appended claims without departing from their full scope and equivalents. Also, descriptions of well-known functions and constructions are omitted for clarity and conciseness. Likewise, certain naming conventions, labels and terms as used in the context of the present disclosure are non-limiting and provided only for illustrative purposes to facilitate understanding of exemplary implementations of the illustrative embodiments.

Generally, illustrative embodiments disclose system and method including an ICN-over-IP architecture, which supports ICN-dependent IP addresses as an integrated architecture. Exemplary implementations of the disclosure are particularly applicable to IPv6.

Figure 1:
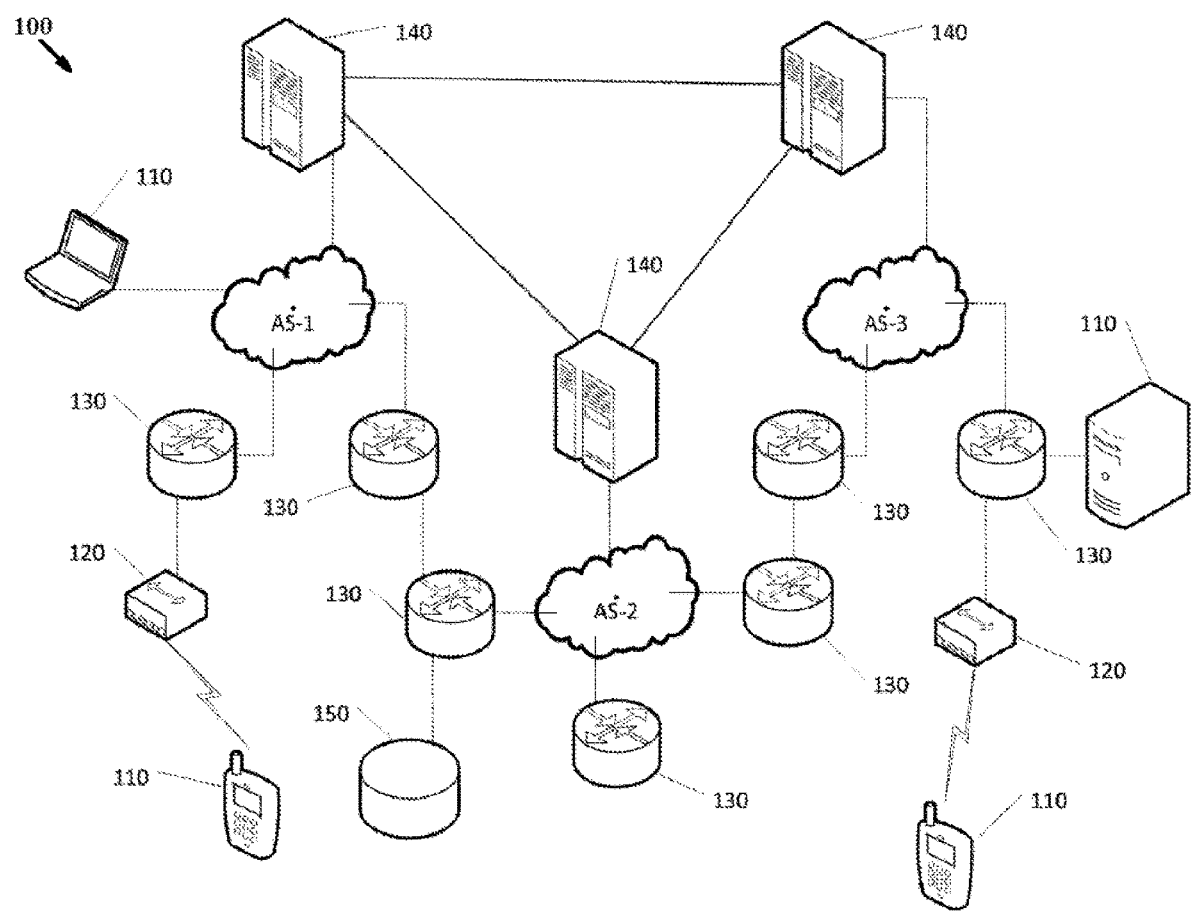
FIG. 1 illustrates an example of a network that supports an integrated architecture according to exemplary implementations of embodiments of present disclosure.

FIG. 1 illustrates a network 100 that supports ICN-dependent IP addresses as an integrated architecture according to the present disclosure. The system 100 may comprise a plurality of nodes (N) 110 serviced by a plurality of access points or gateways 120 providing network access to the nodes 110, a plurality of routers (R) 130, also referred to as edge/service/core routers (ER, SR, CR), a plurality of interconnected domain controllers or autonomous systems (AS) 140, and one or more content repositories 150. A domain may correspond to a group of network elements (for example computers, devices etc.) on a network that are administered as a unit with common rules and procedures. A domain controller 140 can be a server computer, a domain name server, that can respond to security authentication requests (such as logging in, or permission check) and give access to its domain or system resources, including for example to user logging into its domain or another trusted domain or interconnected domain. In network 100, each entity (e.g. content portion, chunk, node, or networking element) may be uniquely identified by an identifier. Each node 110 may be a Consumer or a Producer of content as discussed in this disclosure. ICN network 100 may implement any of a various protocols for requesting and delivering content. An example protocol is Content Centric Networking (CCN). The CCN protocol is a transport protocol built on named data irrespective of the identities or locations of machines involved. CCN has no notion of host at its lowest level. In its intended purpose, a packet "address" names content, device, or service, but not the actual location of the content, even though location can also be considered as one type of such name. The CCN protocol efficiently delivers named content rather than connecting hosts to other hosts. Every packet of data may be cached at any gateway 120, content router 130, and domain controllers 140, if supported. Combined with intrinsic support for multicast or broadcast delivery, this leads to a very efficient use of the network when many people are interested in the same content.

The CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. Specifically, an Interest message can identify a chunk of content to retrieve. Alternatively, an Interest message can provide a name prefix and other qualifications to restrict what data is acceptable from the collection named by the prefix. The Content Object is used to supply data. A Content Object message not only contains a data payload but the identifying name (without the implicit digest component), a cryptographic signature, and identification of the signer (called the publisher) along with other information about the signing. Formally, a Content Object message is an immutable binding of a name, a Producer, and a chunk of data. Every Content Object message is required to contain a valid signature. In this way, all data communicated with the CCN protocol is attested.

Communication using the CCN protocol is receiver-controlled. To obtain a particular content item, a Consumer of data transmits an Interest message over available connectivity and any party receiving the message and having data that matches, or satisfies, the request (according to the specifications in the Interest Message) may transmit a matching Content Object message. The content item or data may be identified using hierarchically structured names that represent relationships between the different content items within the CCN. These names comprise any number of components where each component identifies a portion of a namespace. A namespace can represent a collection of all possible addresses, names, or identifiers of objects (for example network nodes, devices, etc.) on a network, internetwork, or the Internet. A namespace may identify a space of all names for a given type of network name. Data is only transmitted in response to an Interest that matches the Data. An Interest message may be transmitted using broadcast or multicast facilities of the underlying transport in order to reach many potential sources of data.

Figure 2:
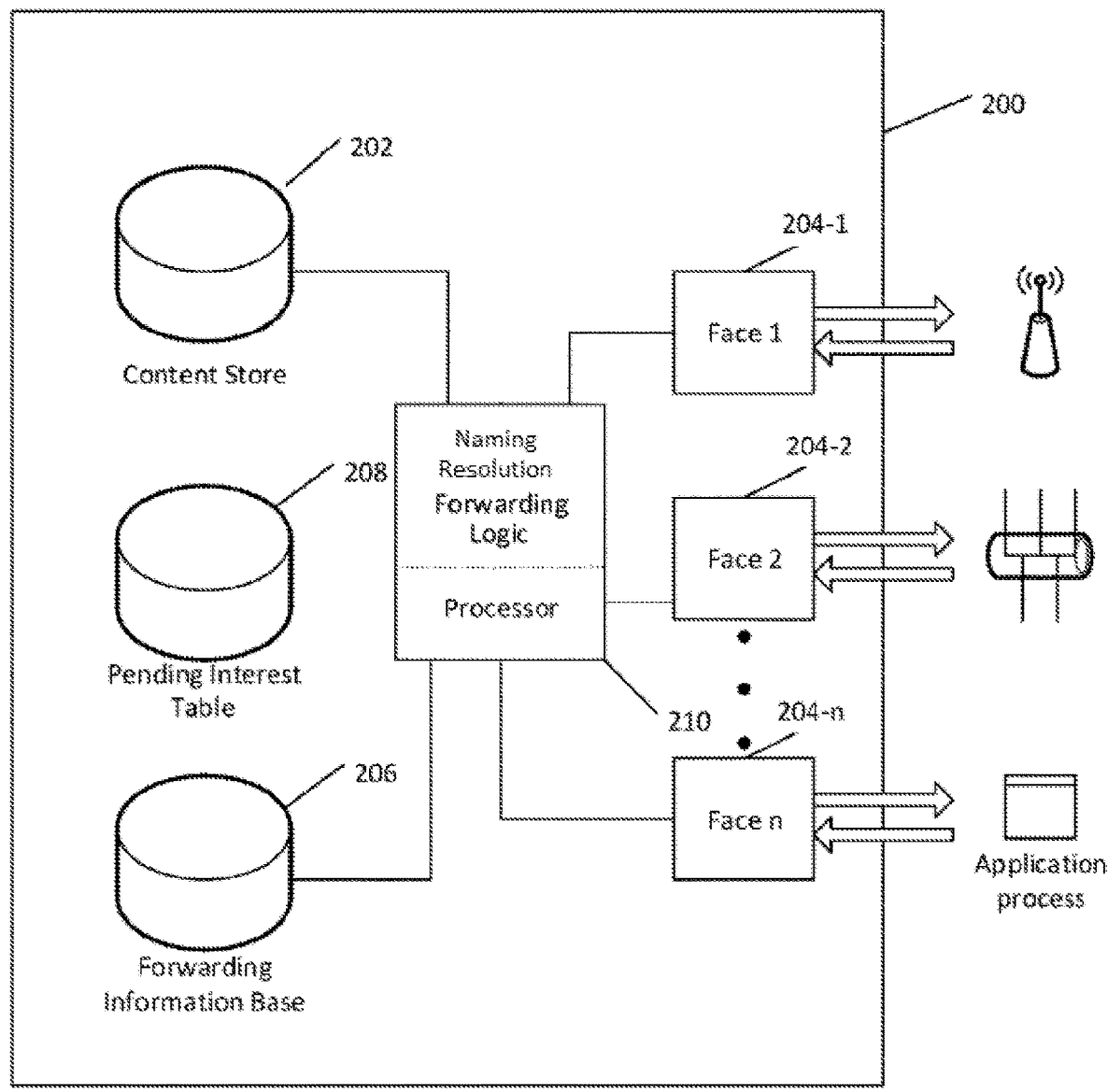
FIG. 2 illustrates in a generalized block diagram an example of a network component configuration according to exemplary implementations of embodiments of the present invention.

FIG. 2 shows an example of components at a gateway 120, content router 130, or other entity in ICN network 100 operating as an intelligent CCN node 200 implementing the disclosed CCN protocol. An intelligent CCN node in the proposed architecture includes the following data structures to facilitate translation of content identifiers to IP addresses, on-path caching, resolution of namespaces to content sources, and name-based forwarding. Proposed CCN node 200 includes a Content Store (CS) 202, one or more network interfaces (Faces) 204-1 to 204-n, a Forwarding Information Base (FIB) 206, a Pending Interest Table (PIT) 208, and Processor 210 with naming and/or translating and forwarding logic. CS 202 has a buffer memory organized for retrieval of Content Objects by prefix match lookup on names. Since CCN Content Object messages are self-identifying and self-authenticating, each one is potentially useful to many Consumers. CS 202 implements a replacement policy that maximizes the possibility of reuse such as Least Recently Used (LRU) or Least Frequently Used (LFU). CS 202 also implements a staleness bit. CS 202 may retain Content Object messages indefinitely but is not required to take any special measures to preserve them. Each CS 202 associates a staleness bit with every Content Object.

Faces 204-1 to 204-*n* are a generalization of the concept of an interface. Faces 204-1 to 204-*n* may be a connection to a network or directly to an application. Faces 204-1 to 204-*n* may be configured to send and receive broadcast or multicast packets on a particular network interface, or to send and receive packets using point-to-point addressing in the underlying transport, or using a tunnel (for example a TCP tunnel). Faces 204-1 to 204-*n* may also be the connection to a single application process running on the same machine, via an encapsulation like user datagram protocol (UDP) or an OS-specific inter-process communication path. All messages arrive through a face and are sent out through a face. Each face may have a plurality of line cards providing ingress to and egress from CCN node 200.

FIB 206 provides a table of outbound faces for Interests, organized for retrieval by longest prefix match lookup on names. Each prefix entry in FIB 206 may point to a list of Faces 204-1 to 204-*n* rather than only one.

PIT 208 is a table of sources for unsatisfied Interests, organized for retrieval by for instance using longest prefix match lookup on names, or using an exact match on names. Each entry in PIT 208 may point to a list of sources. Entries in PIT 208 time out rather than being held indefinitely.

Processor 210 interfaces with CS 202, PIT 208, FIB 206, and Faces 204-1 to 204-*n* to process Interest and Content Object messages and further configured to perform additional processing pursuant to this disclosure.

Figure 6:
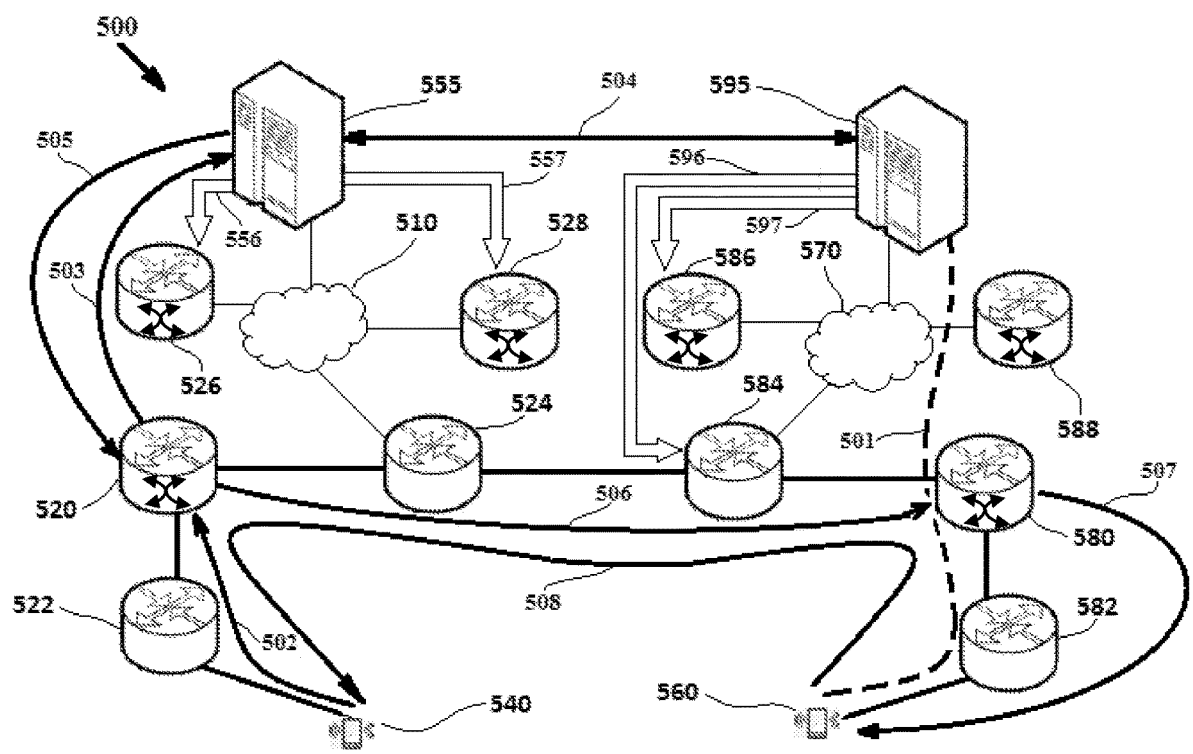
FIG. 6 illustrates an example of an architecture in a network according to exemplary embodiments of the present disclosure.

In an illustrative embodiment, as diagrammatically shown in a non-limiting example of FIG. 6, proposed architecture 500, which can be deployed in a network 100 and includes producer domain 570 and consumer domain 510, uses anycast-ICN-identifier (ID) and/or ICN-router-ID as locator. Anycast addressing, which is explicitly supported in IPv6, is a "one-to-one-of-many" association where data is routed to a single receiver selected by a routing algorithm, for example as a "nearest" receiver, from a group of receivers that are all identified by the same destination address.

In a further exemplary implementation, proposed architecture 500 uses name-hash as content-ID. A hash function can be used to map data of any size to data of a fixed size, such as mapping of names to integers. The use of name-hash as content-ID according to exemplary embodiments of the disclosure will be described further in the context of exemplary implementations of the embodiments of the disclosure.

Exemplary implementations can depend on the forwarding scenario, for instance, whether the packet is forwarded within consumer domain 510, within producer domain 570 or in-between consumer domain 510 and producer domain 570.

Benefits resulting from such systems and methods with proposed architecture include, for example and without limitation, incremental integration of ICN within the current IP-based networking infrastructure, and facilitating the meeting of following exemplary objectives: (i) introducing small changes within the network; (ii) efficient utilization of the incrementally introduced ICN-enabled IP routers (for example, ICN-enabled IP routers can be distributed within/across domains and capable of coordinating among others based on domain or ICN imposed policies); (iii) improved performance with the introduction of additional ICN-enabled IP routers within/across domains; and (iv) continued efficient performance by relying on the principles of the current IP forwarding and taking advantage of IP's currently available features.

According to illustrative embodiments of the disclosure, the methods and systems including an architecture that enables incremental use of ICN within IP networks applicable to IPv6 can provide naming and translation of names to IP addresses to support packet forwarding using by-default IP headers and IP-based addressing features; and ICN-enabled routing and resolution logic functionalities to register names with direct mapping to IP addresses, and resolve namespaces converted to IP addresses to content sources, publisher or repositories, directly, for example, by directly mapping to publisher identifier, or indirectly, for example, by mapping to a location which carries further information on the source/publisher.

Exemplary embodiments of the present disclosure provide system and methods that integrate ICN addresses within IP to enable incremental use of ICN in current IP networks, using IP addressing. Further exemplary embodiments introduce alternative mapping systems (or updates on existing mapping systems) to translate content names to globally routable IP addresses.

Exemplary implementations of the embodiments of the present disclosure provide ICN-based IP addressing formats which can facilitate differentiation between regular IP addresses versus ICN-driven IP addresses; and extraction of information from the ICN-based IP addresses. Further exemplary implementations of the embodiments of the present disclosure provide ICN-based forwarding framework using IP to facilitate forwarding at both ICN-enabled IP routers and regular IP-only routers. Yet further exemplary implementations of the embodiments of the present disclosure provide ICN name to IP address mapping system, which can achieve efficient mapping of content names or namespaces to unique IP addresses to avoid collisions.

Exemplary implementations of embodiments of the present disclosure supplementing IP forwarding with ICN principles to enable stateful forwarding, for example, by utilizing states carried within ICN-enabled routers creating traces to perform intelligent and resource efficient packet forwarding. According to an exemplary implementation, stateful forwarding is achieved by swapping source/destination addresses and storing the information on them to traceback the route back to the requesting host. Further exemplary implementations integrate content names within IP addressing mechanisms to directly forward requests towards a content source, by including both locator and identifier portions directly within the IPv6 address space.

According to illustrative embodiments, disclosed architecture further supports semi-stateful, and stateless forwarding. According to another exemplary implementation, semi-stateful forwarding is achieved by keeping states at the first/last ICN-enabled IP routers, or a subset of the ICN-enabled IP routers along request/data path, potentially resulting in non-symmetric request/data paths, in between these routers. According to yet another exemplary implementation, stateless forwarding is achieved by accumulating domain/ICN-router-Identifiers to create reverse-path information within packet headers as an ICN-specific IPv6 extension header.

Exemplary implementations of the embodiments of the disclosure provide for use of extension headers in IPv6 using the Next Header field where in an exemplary architecture upper layer header can be set to a new type to be defined as Type-ICN; for example: TCP uses 6, UDP uses 17, ICMPv6 uses 58, and ICN can use one of the available values. In other exemplary implementations, additional header types that might be specific to ICN-based routing can be introduced, or the use of destination extension header can be modified, which for ICN can allow for any ICN-enabled router to examine it, in addition to destination, in which case, content name might be completely integrated within this portion of the header. In further exemplary implementations, hop by hop options can be utilized to identify whether packet is of type ICN. Yet other exemplary implementations can provide a routing option to forward request to an intermediate destination, for example a well-known ICN-enabled IP router, or an ICN supporting name resolution server, before the packet is forwarded to its final destination, which can be a publisher or a cache.

According to illustrative embodiments, naming and translation of names or content identifiers to IPv6 addresses can use manifests, where a manifest would include information on the content carrying host or hosting servers. In general, a manifest is an object describing the properties of the content object that are relevant at the network layer including, for example, the location of the object, security properties, information regarding the transport of the object including for example the object's size, and information on how to acquire content from a specific set of hosts. Information, for instance, can include a top-level namespace under which hosts can request content, hashing format, and domain/(anycast or specific) ICN-enabled router identifier(s). Multiple options according to exemplary embodiments of the present disclosure are available on addressing and translation of names to IPv6 addresses.

Figure 3:
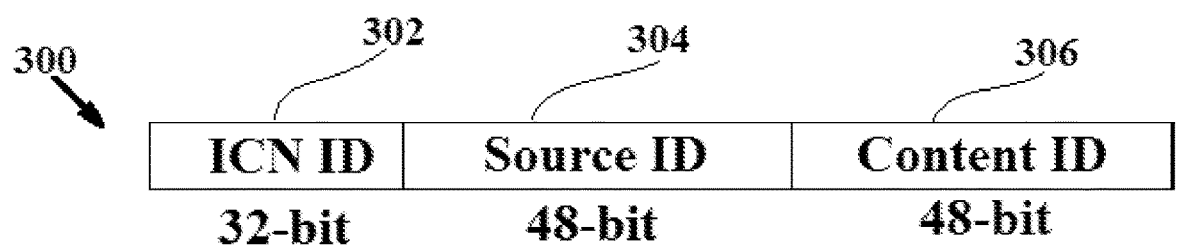
FIGS. 3, 4, and 5 illustrate examples of addressing formats in accordance with exemplary embodiments of the present disclosure.

Referring to FIG. 3, according to an exemplary implementation of embodiments of the disclosure, translated addressing format 300 of content identifiers to IPv6 addressing format can comprise:
- 32-bit ICN identifier 302, which can be reserved for use by ICN-specific communications within IP networks. In an exemplary implementation, ICN identifier 302 can be shorter, for example 24-bit.
- 48-bit Device/Publisher, or Source, identifier 304, which can be obtained during initial discovery, or through a manifest, and which is unique to each server.
- 48-bit Content identifier 306, which is created using cryptographic hashes.

A cryptographic hash is a result of cryptographic hashing function that maps data of any size to a bit string of fixed size, which is impossible to invert. One of the features of cryptographic hashing is that the same message always results in the same hash. Cryptographic hash functions are used in information-security applications for authentication, but can also be used to index data in hash tables, to detect duplicate data, or uniquely identify files.

In the example of translated addressing format 300, ICN ID 302 and Source ID 304 can be locators, and Source ID 304 and Content ID 306 can be identifiers.

Figure 4:
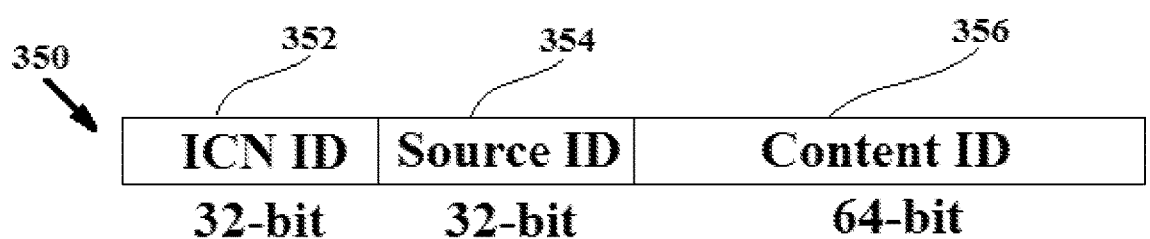

Referring to FIG. 4, according to another exemplary implementation of embodiments of the disclosure, addressing format 350 for IPv6 addressing can utilize a shorter host identifier, such as its unique IPv4 address, in which case, a longer 64-bit content identifier can be utilized, comprising:
- 32-bit ICN identifier 352.
- 32-bit Device/Publisher/Host, or Source, identifier 354, which can be IPv4 address.
- 64-bit Content identifier 356, which can be a cryptographic hash.

In the example of translated addressing format 350, ICN ID 352 and Source ID 354 can be locators, and Source ID 254 and Content ID 356 can be identifiers.

Figure 5:
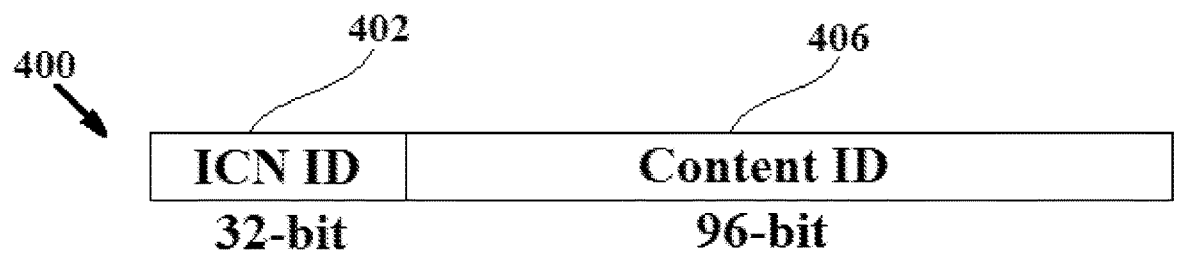

Referring to FIG. 5, according to yet another exemplary implementation of embodiments of the disclosure, addressing format 400 for IPv6 addressing can include a pure-ICN specific, or content based, addressing format comprising:
- 32-bit ICN/ICN-router identifier 402
- 96-bit Content identifier 406

Exemplary approaches described with reference to FIGS. 3, 4, and 5 would allow for on-path caching where: a request is forwarded towards the content source/publisher from where the content can always be retrieved; and, if the content is cached at an intermediate ICN-enabled IP router, it can also be retrieved from there, from the ICN content store (see, for example, content store 202 in FIG. 2 described above).

According to exemplary embodiments of the present disclosure, ICN-enabled mapping servers, or ICN-IP mapping servers (I-MAPs) 595, can be provided for resolution and forwarding, as explained in detail below with reference to exemplary implementations illustrated in FIGS. 6 through 11. Exemplary implementations may include I-MAPs that can provide minimum support necessary to resolve names to forwarding identifier, and exemplary methodology of forwarding requests towards content sources, can be illustrated with reference to FIGS. 1, and 3 to 10.

Referring to an example of FIG. 6, a system 500 according to exemplary implementation of the disclosure comprises a consumer 540 in communication with a producer 560, either of consumer 540 or producer 560 can be or can comprise a device, such as any one of a tablet, computer, smart phone, or any other electronic device capable of connecting and/or interfacing directly and/or indirectly, by wired and/or wireless communication, to transmit, receive, store, generate and/or process data on a network.

Consumer 540 can have been associated therewith, or within its domain 510, one or more anycast intelligent ICN-enabled IP routers (A-IPR) 520, 526, 528, routers 522, 524 and an I-MAP 555 for example in communication with any one or more of A-IPRs, such as A-IPR 526 and A-IPR 528, respectively, within domain 510. A-IPR can operate similar to an ICN service router within IP domain. A-IPR is configured to provide additional functionality according to embodiments of the disclosure to facilitate integration of content names within IP addressing to directly forward requests toward a content source, such as a content producer or cache, by including both locator and identifier portions directly within IPv6 address, as explained below with reference to examples of FIGS. 6 to 11.

Likewise, producer 560 can have been associated therewith, or within its domain 570, one or more A-IPRs 580, 586, 588, routers 582, 584, and an I-MAP 595 for example in communication 596, 597 with any one or more of A-IPRs, such as A-IPR 580 and A-IPR 586, respectively, within domain 570.

Methodology 500 according to exemplary embodiments of the disclosure including communication 501, 502, 503, 504, 505, 506, 507, 508 between system components that facilitate, for example, content delivery from producer 560 to consumer 540 are described with reference to FIGS. 6 to 11 as follows.

Figure 7:
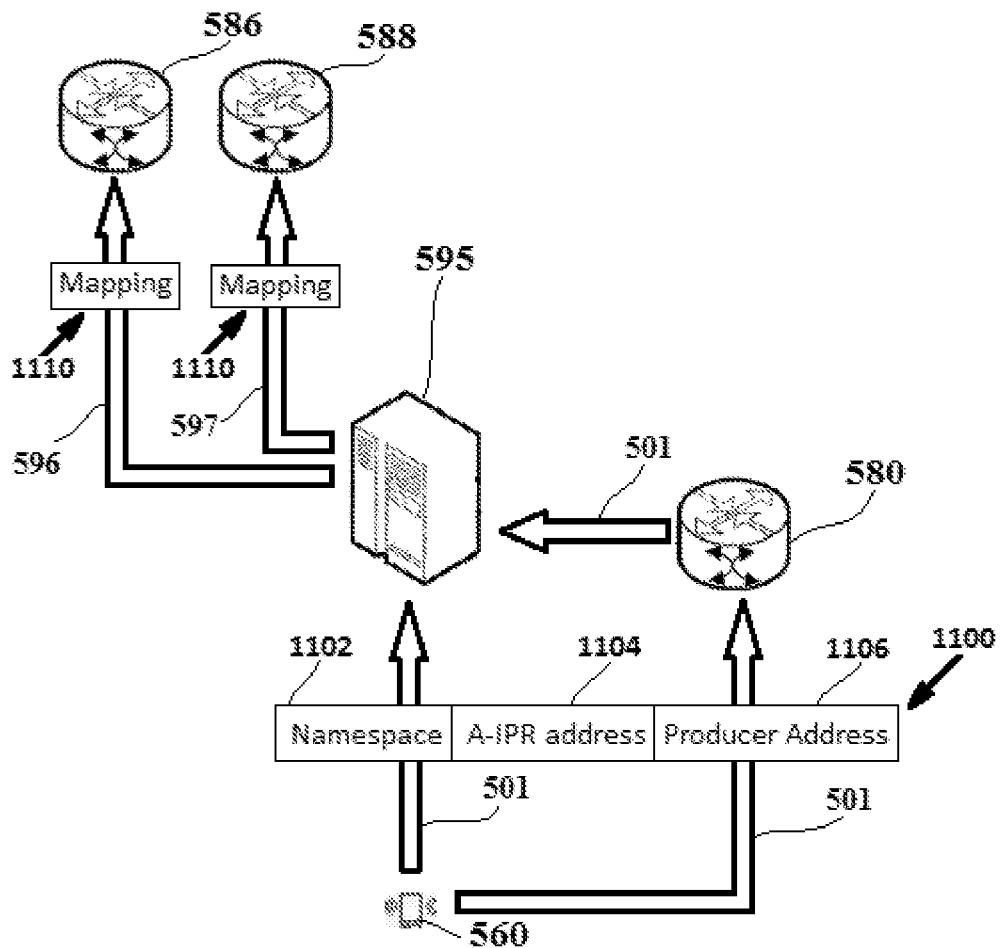
FIG. 7 illustrates an example of communication and processing within architecture of exemplary embodiments of the present disclosure.
Figure 11:
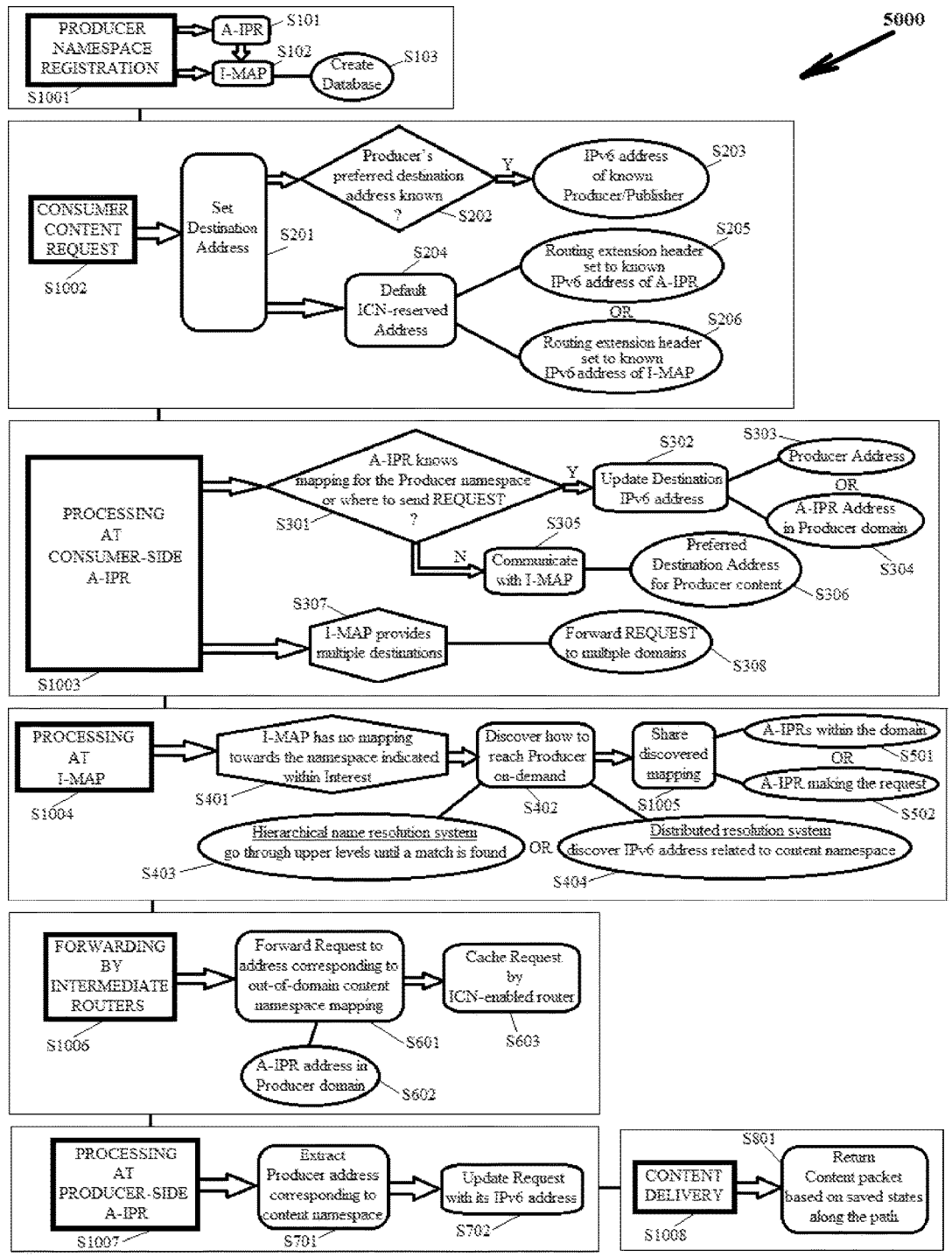
FIG. 11 illustrates in a process diagram an example of communication methodology according to illustrative embodiments of the disclosure

Referring to an example of FIGS. 6, 7 and 11, registration 501 according to exemplary embodiments of the disclosure, includes registration process S1001 where producer 560 registers its namespace 1102 using one of two approaches:
1. Through A-IPR 580 and then I-MAP 595 (step S101).
2. Through I-MAP 595 directly (step S102).

Registration process S1001 maps namespaces associated with Producer 560 to an assigned IP address 1104 comprising the IPv6 address of the receiving A-IPR, such as A-IPR 580, or a common anycast IPv6 address shared by the A-IPRs, such as A-IPR 588 and A-IPR 586, within producer domain 570. Producer's 560 namespace with its assigned IP address and Producer's reachability information within its domain are stored within registration entry 1100 at the I-MAP 595 (namespace 1102, A-IPR(s) address 1104, Producer address 1106). Producer address 1106 may include an address associated with Producer's 560 device. Producer address 1106 to Producer namespace(s) 1102 mapping is distributed 596, 597 to A-IPRs 588, 586. I-MAPs, such as I-MAP 595, can create a hierarchically structured database (S103) comprising entries, such as entry 1100, to share with other I-MAPs, such as I-MAP 555.

According to an exemplary implementation, information can be shared as encoded bloom filters such as counting bloom filter (CBF) to allow for easy incremental updates. Unlike traditional address-based forwarding, where messages are given explicit destination addresses, the movement of messages through is driven by terms applied to the content of the messages.

Figure 8:
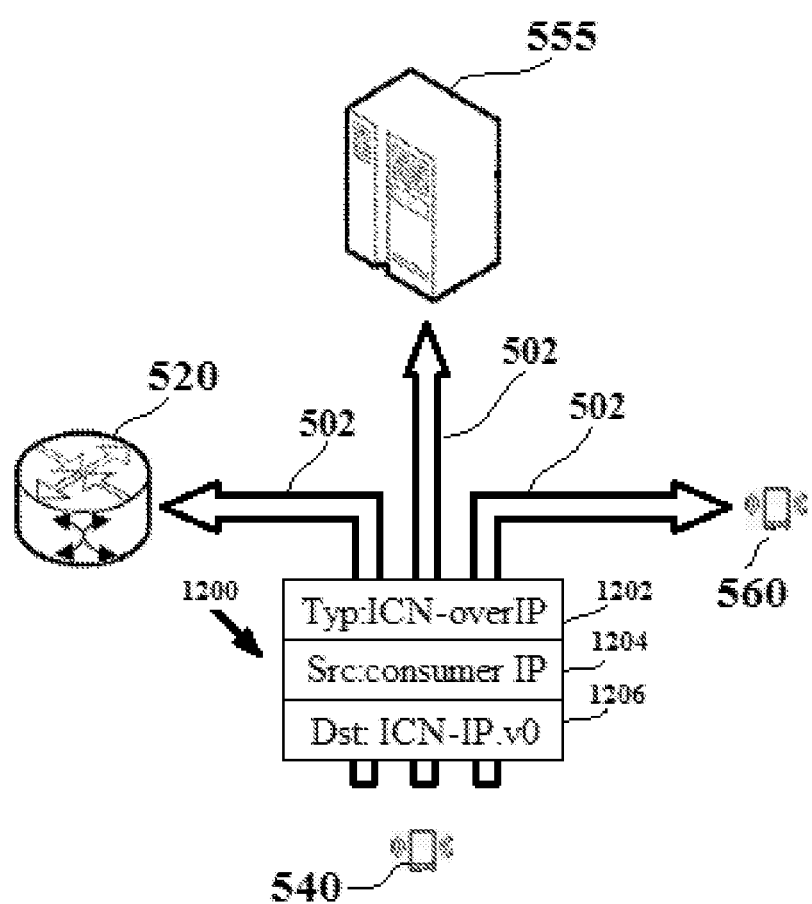
FIG. 8 illustrates other examples of communication and processing within architecture of exemplary embodiments of the present disclosure.

Referring to an example of FIGS. 6, 8 and 11, the process 502 of requesting content by consumer according to exemplary implementation of a design framework of the embodiments of the disclosure includes step S1002 where consumer 540 makes a request 1200 (type 1202, source address 1204, destination address 1206) for a content. In an exemplary implementation of the disclosure, consumer 540 can set (S201) the destination address 1206 as a default ICN-reserved address (S204), while setting the routing extension header to a known IPv6 address of an A-IPR router, such as A-IPR 520 (S205). In another exemplary implementation of the disclosure, consumer 540 can set (S201) the destination address 1206 as a default ICN-reserved address (S204), while setting the routing extension header to a known IPv6 address of the ICN-IP mapping server, such as I-MAP 555, for its domain 510 (S206). In yet another exemplary implementation of the disclosure, if consumer 540 knows the preferred destination address 1206 for the producer 560, (S202), consumer 560 can set the destination IPv6 address of the known producer/publisher 560 (S203).

Figure 9A:
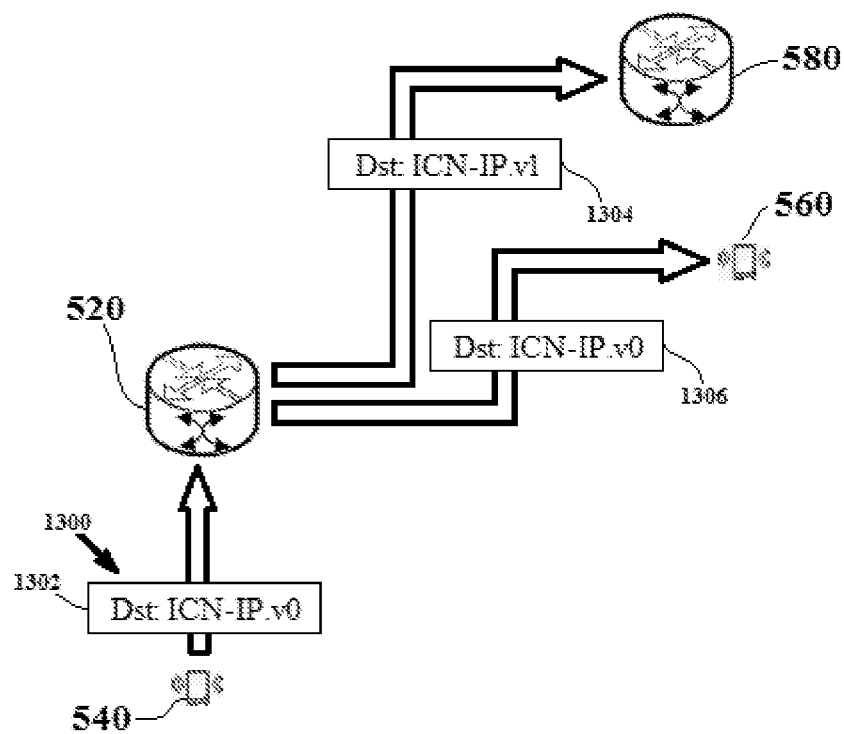
FIGS. 9A, 9B, and 9C illustrate yet further examples of communication and processing according to exemplary embodiments of the present disclosure.

Referring to an example of FIGS. 6, 9A, and 11, the processing of a consumer request 1300 at consumer-side A-IPR, such as A-IPR 520, according to exemplary implementation of a design framework of the embodiments of the disclosure includes step S1003 in the case where producer address is not present, such as where consumer 540 does not include address of producer 560 within header of request 1300 which includes destination 1302. In an exemplary implementation of the disclosure, if A-IPR 520 has the mapping for the namespace of producer 560 (S301), A-IPR 520 can update the destination IPv6 address (S302) before forwarding the request 1300 towards the destination. For example, the updated destination 1306 can be address of producer 560 (S303). In another example, the updated destination 1304 can be address of an A-IPR, such as A-IPR 580, which resides in the producer domain 570 (S304).

Figure 9B:
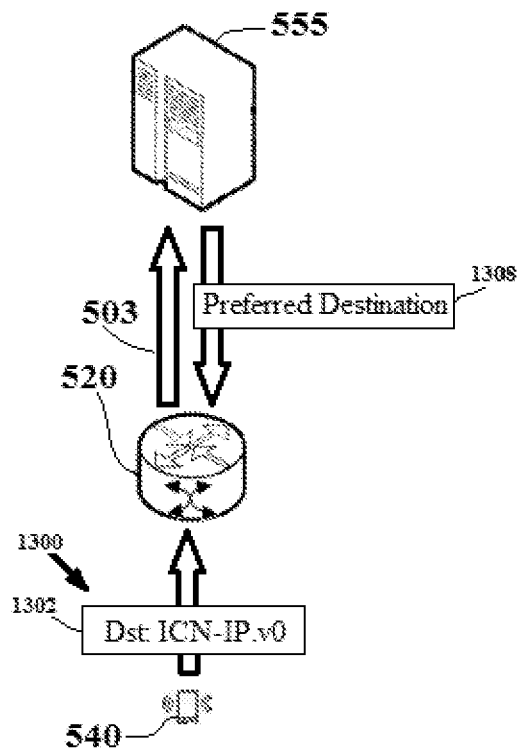

In another exemplary implementation, referring to an example of FIGS. 6, 9B, and 11, if A-IPR 520 has no knowledge on where to send the consumer request 1300 (S301), then A-IPR 520 can communicate 503 with the I-MAP 555 (S305) to get 505 preferred destination address 1308 for the content of producer 560 (S306).

In yet another exemplary implementation, if I-MAP 555 provides multiple destinations (S307), request 1300 can be forwarded to either multiple domains (S308), iteratively or successively, for instance using probing; or using routing extension header to forward through multiple domains, in which case, architecture can choose whether or not to utilize for example a Pending Interest Table (PIT) at the intermediate ICN-enabled IP routers, such as A-IPR 526 or A-IPR 528.

Figure 9C:
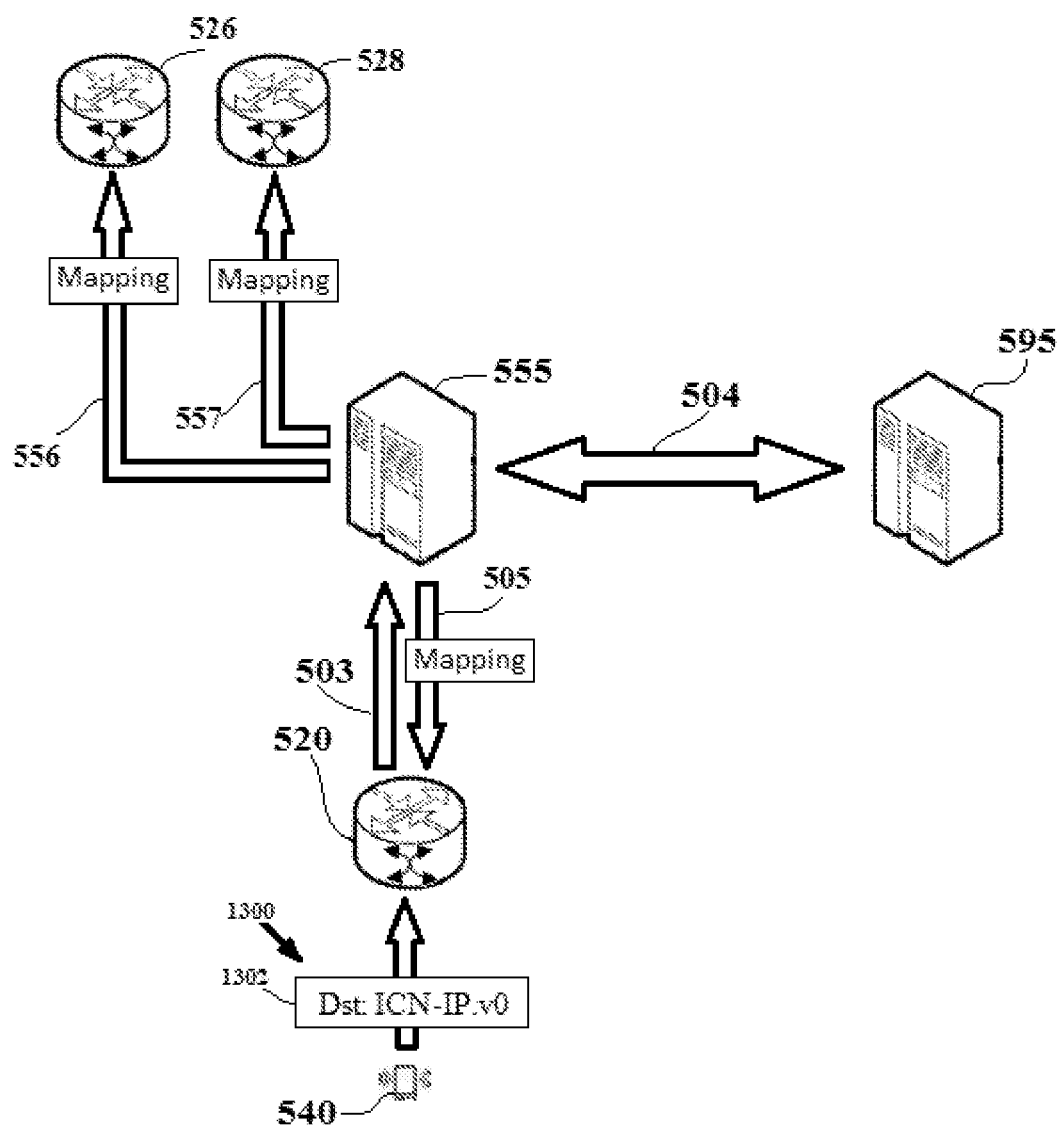

Referring to an example of FIGS. 6, 9C, and 11, processing 504 at I-MAP, such as I-MAP 555 and I-MAP 595, according to an exemplary implementation of the embodiments of the disclosure, includes step S1004 where, if I-MAP has no mapping towards the namespace indicated within the Interest (S401), then I-MAP, such as I-MAP 555 in communication with I-MAP 595, needs to discover how to reach producer 560 on-demand (S402). For example, if a hierarchical name resolution system is used, then I-MAP, such as I-MAP 555, searches through upper levels until a match is found (S403). In another example, a distributed resolution system can be used to discover IPv6 address related to content namespace (S404). In a distributed resolution system, computing resources can be dispersed throughout the network and cache lookup information to facilitate name resolution. For example, if an I-MAP, such as an I-MAP 555, cannot resolve the name, it contact another I-MAP, such as I-MAP 595, or another domain name server (such as 140 as illustrated in FIG.1) until a match is found (S404).

Referring further to the example of FIGS. 6, 9C, and 11, processing 505 at I-MAP, such as I-MAP 555 and I-MAP 595, according to exemplary implementation of the embodiments of the disclosure, further includes step S1005 where, after the mapping is discovered, it is shared 505 with the A-IPR making the request (S501), such as A-IPR 520, or shared 505, 556, 557, with all the A-IPRs, such as A-IPR 520, A-IPR 526 and A-IPR 528, residing within the consumer domain 510 (S502).

Figure 10:
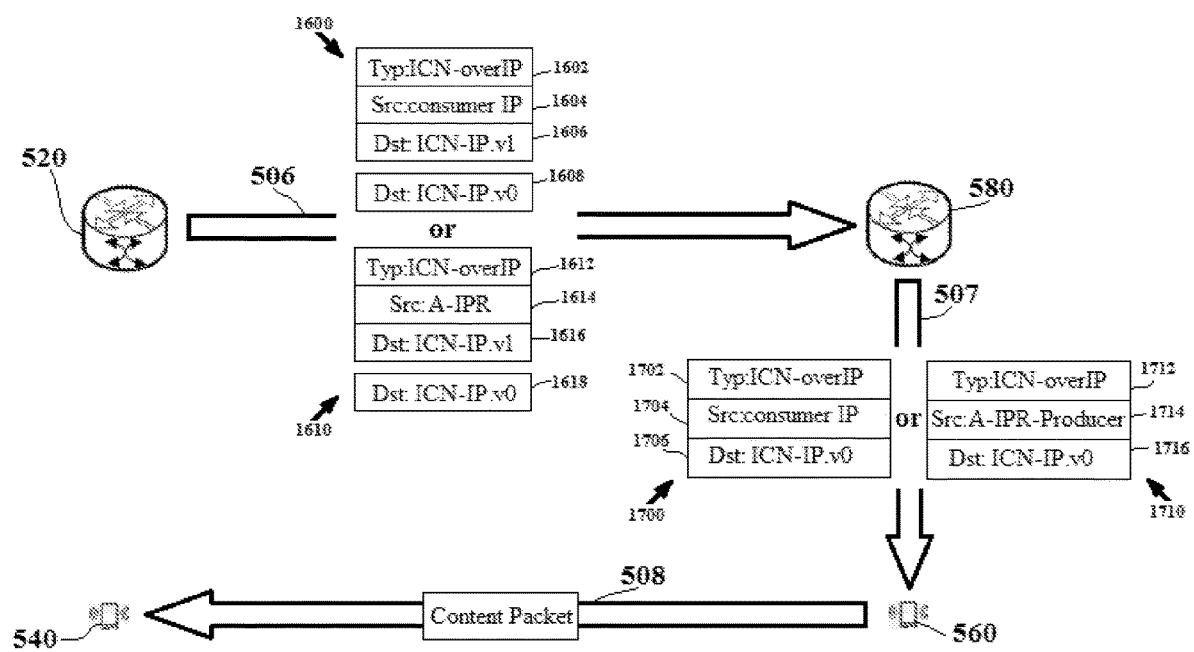
FIG. 10 illustrates still further examples of communication and processing according to exemplary embodiments of the present disclosure.

Referring to an example of FIGS. 6, 10, and 11, forwarding 506 by intermediate routers, such as routers 520 and 580, according to exemplary implementation of the embodiments of the disclosure, further includes step S1006 where request 1600 (type 1602, source 1604, destination 1606, extension header 1608) or 1610 (type 1612, source 1614, destination 1616, extension header 1618) is forwarded to the address corresponding to out-of-domain content namespace mapping (S601), which is the address of an A-IPR residing outside of consumer domain 510, such as A-IPR 580 residing in producer domain 570 based on the content namespace mapping (S602). Request can be cached by any ICN-enabled router (S603) to take advantage of features enabled at such routers, for instance to leave breadcrumbs in the PITs that are used for stateful forwarding and maintain caching opportunity for returning content packets.

Referring further to the example of FIGS. 6, 10, and 11, processing 507 at producer-side A-IPR, such as A-IPR 580, and content delivery 508, according to exemplary implementation of a design framework of the embodiments of the disclosure include steps S1007 and S1008, respectively. In step S1007, at the A-IPR, such as A-IPR 580, address of producer 560, corresponding to the content namespace, is extracted (S701) and the request is updated with its IPv6 address (S702). In step S1008, content packet is returned 508 based on the saved states 1700 (type 1702, source 1704, destination 1706), or 1710 (type 1712, source 1714, destination 1716), along the path (S108).

In yet another illustrative embodiment of the disclosure, direct content addressing schemes can be used to allow end hosts calculate IP-addresses associated with content sources, for example IP address of content server to reach content sources directly. In an exemplary implementation, content names can be assigned longer K-bit hash addresses using cryptographic hash functions. For example, original hash output can be very long, 256-bits or 512-bits, after which the original hash output can be split to create multiple smaller K-bit hash outputs.

In an exemplary implementation, an ICN-address space can be structured without using a source/device identifier, in which case the address format can be ICN-reserved-IPv4:: K-bit-content-identifier, where the ICN portion can be reserved as a 32-bit long identifier, and the contents (devices, applications, etc.) can be assigned 96-bit hash-based identifiers (see, for example, FIG. 5 described above). Contents can be registered through the closest ICN-enabled IP router's address space plus the content address, which is an identifier uniquely linked to the information content itself which can include, for example IP address of content source (see, for example, FIGS. 3 and 4 described above). In another exemplary implementation, each ICN-enabled IP router's IPv4 address can represent the first 32-bit ICN-reserved portion of the global content address space. To support such implementation, translation may also be implemented to help with global packet forwarding, from A-IPRs to remote domain, in which case content address can be included. To make a request, a consumer would calculate hash of content name and send the request using anycast to one of the closest ICN-enabled IP routers, where the first 32-bit portion of the address space would be an anycast-ICN reserved address, which can be programmed within a domain to deliver packets to the closest ICN-enabled IP routers. A resolution system can then take care of identifying the address space for destination side ICN-enabled router matching the content identifier. For example, there are different forms of name resolution in the Internet that use a distributed database system, Domain Name System (DNS), which runs as an application on the Internet, using IPv4 or IPv6 (or both), and is used to map between host names and IP addresses and vice versa.

In still another illustrative embodiment of the disclosure, multi-hash addressing can be used for example to improve the resolution and forwarding efficiency. According to an exemplary implementation, multiple hashes for the routable content prefix can be created, for instance, by dividing the original length hash output into multiple 96-bit long components, in which case the globally routable IPv6 address for the content identifier would be one of the available ones. Optional implementations for determining a router identifier are within the scope of the disclosure.

An example of an option for determining a router identifier includes requesting ICN-enabled router identifier for all of the possible namespaces, which in an exemplary implementation, involves consumer or anycast ICN-enabled router performing iterative or simultaneous multiple probing for any previously unmapped request. If all requests return a common identifier, then it is chosen as the ICN-enabled router ID/address.

In another example each name is registered within the domain, as A-IPR address plus a 96-bit portion, for determining a router identifier. In an exemplary implementation, name registration involves registering one of the possible 96-bit hashes that does not create collision.

In an exemplary implementation, resolution utilizes lookup on flat-hashes, where a hash function maps each network node's unique identifier, so registration can be done by mapping full-hash (concatenated hash) to a specific resolution server. For example, the mapping can be acquired using original hash output to map to a unique resolution server identifier, or, if knowledge on the host/device identifier is available, using hash of that host/device identifier to determine a resolution server responsible for carrying its mapping.

Yet another exemplary implementation utilizes ICN-specific mapping database where registration to resolution servers can utilize CBF-driven updates to limit messaging overhead. For example, original content hash can be used recursively to determine the necessary hash values to determine location input for the CBF database, and updates can be increments/decrements of specific elements rather than resending the whole filter to the server. In a further exemplary implementation, entries can be domain specific to further reduce the overhead, for example by combining filters sent by different A-IPRs, aggregating them based on domain identifiers.

Yet further exemplary implementation provides another possibility for multi-hash alternative where a 96-bit hash identifier is split into two components: a 32-bit common hash, which identifies resolution server for the host, and a 64-bit component, which identifies different hashes for the same prefix. In an exemplary implementation, one request can be sufficient to identify the correct ICN-enabled-IP router's address. In another exemplary implementation, original 96-bit hash can be used to make the request after content name is resolved to a matching ICN-enabled router address/domain.

In still yet further exemplary implementation, content names within the IP header as an extension header can be used. Such an implementation may require additional processing of the name at any ICN-enabled IP router receiving the request.

Figure 12:
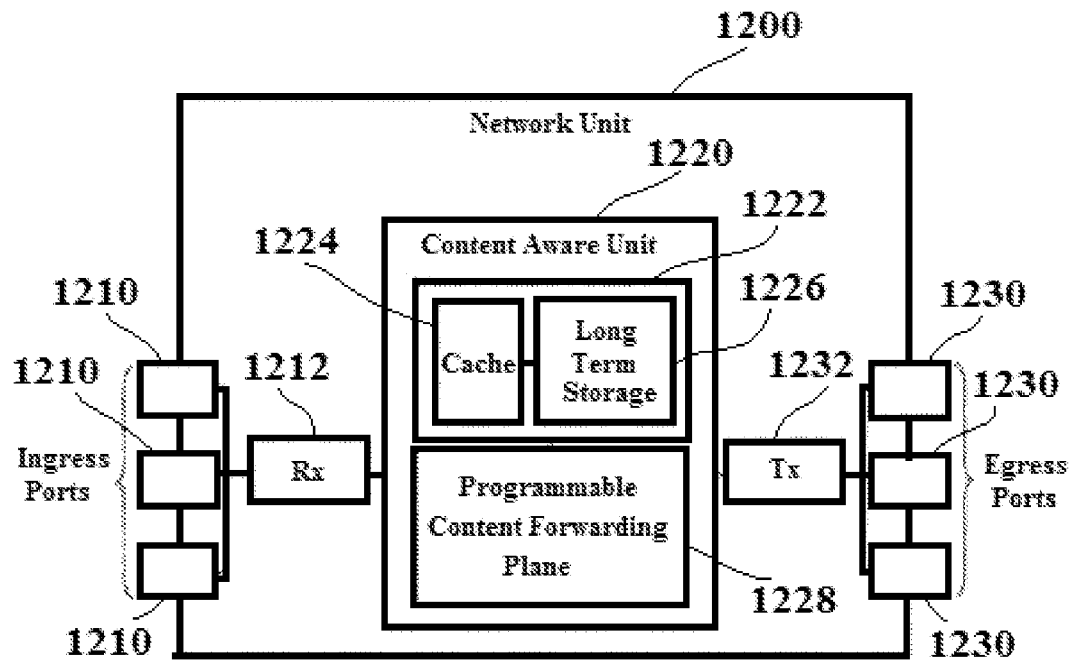
FIG. 12 illustrates in a generalized block diagram an example of a network unit configuration for performing communication and processing of data in a network.

FIG. 12 illustrates an embodiment of a network unit 1200, which may be any device that transports and processes data through network 100, including through the A-IPR and/or I-MAP according to the present disclosure. For instance, the network unit 1200 may correspond to or may be located in any of the system nodes described above, such as a content router R, edge router ER, service router SR, and core router CR. The network unit 1200 may also be configured to implement or support the schemes and methods described above. The network unit 1200 may comprise one or more ingress ports or units 1210 coupled to a receiver (Rx) 1212 for receiving signals and frames/data from other network components. The network unit 1200 may comprise a content aware unit 1220 to determine which network components to send content to. The content aware unit 1220 may be implemented using hardware, software, or both. The network unit 1200 may also comprise one or more egress ports or units 1230 coupled to a transmitter (Tx) 1232 for transmitting signals and frames/data to the other network components. The receiver 1212, content aware unit 1220, and transmitter 1232 may also be configured to implement at least some of the disclosed schemes and methods above, which may be based on hardware, software, or both. The components of the network unit 1200 may be arranged as shown in FIG. 12 or arranged in any other configuration.

The content aware unit 1220 may also comprise a programmable content forwarding plane block 1228 and one or more storage blocks 1222 that may be coupled to the programmable content forwarding plane block 1228. The programmable content forwarding plane block 1228 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1220 or the network unit 1200. The programmable content forwarding plane block 1228 may interpret user requests for content and accordingly fetch content, e.g., based on meta-data and/or content name (prefix), from the network or other content routers and may store the content, e.g., temporarily, in the storage blocks 1222. The programmable content forwarding plane block 1228 may then forward the cached content to the user. The programmable content forwarding plane block 1228 may be implemented using software, hardware, or both and may operate above the IP layer or L2.

The storage blocks 1222 may comprise a cache 1224 for temporarily storing content, such as content that is requested by a subscriber. Additionally, the storage blocks 1222 may comprise a long-term storage 1226 for storing content relatively longer, such as content submitted by a publisher. For instance, the cache 1224 and the long-term storage 1226 may include Dynamic random-access memories (DRAMs), solid-state drives (SSDs), hard disks, or combinations thereof.

Optionally, according to any of the preceding aspects of the disclosure, an exemplary implementation of a content aware unit 1220, or a general purpose network component 1300, can include an assigning module for assigning, a namespace of a producer (such as producer 560) to an IP address of a router (such as router 580), or to a common anycast IP address shared by one or more routers (such as 568, 588, for example within a domain 570 of the producer 560).

Optionally, according to any of the preceding aspects of the disclosure, an exemplary implementation of a content aware unit 1220, or a general purpose network component 1300, can include a storing module for storing structured data (such as an entry 1100 comprising the namespace 1102, the IP address 1104, and a producer address 1106 of a producer 560) in a memory (for example a memory of a server, such as a server 595 for example configured within the domain 570 of the producer 560 and in communication with the router 580).

Optionally, according to any of the preceding aspects of the disclosure, an exemplary implementation of a content aware unit 1220, or a general purpose network component 1300, can include a distributing module for distributing to a router (such as router 580) a mapping of a producer address (such as address 1106) to a namespace (such as namespace 1102 of a producer, such as producer 560).

Optionally, according to any of the preceding aspects of the disclosure, an exemplary implementation of a content aware unit 1220, or a general purpose network component 1300, can include a forwarding module for forwarding a request, such as request 1200 or 1300 of a consumer 540, to an address corresponding to the IP address of the a router (such as router 580 in producer domain 570). Further or alternative implementation can include forwarding module for returning the content (such as Content Object) to the consumer (such as consumer 560) from the producer (such as producer 560) or from a router (such as router 580).

Optionally, according to any of the preceding aspects of the disclosure, an exemplary implementation of a content aware unit 1220, or a general purpose network component 1300, can include a caching module for caching a request (such as request 1200 or 1300) a router (such as router 580) for retrieval from the router.

In an exemplary implementation of unit 1220, the assigning, storing, distributing, forwarding, and or caching can be performed by means of receiver 1212, content aware unit 1220 including programmable content forwarding plane block 1228 and one or more storage blocks 1222, and transmitter 1232 processing signals and/or frame/data as describe above with reference to FIG. 12, where the signals and/or frame/data are indicative of IP address and/or namespace (such as in a structured data entry 1100), a request (such as request 1200 or 1300), and/or content (such as Content Object).

In an exemplary implementation of unit 1300, the assigning, storing, distributing, and/or forwarding can be performed by means of processor 1302, memory devices 1304, 1306, 1308, input/output (I/O) devices 1310, and network connectivity devices 1312 processing signals and/or data as described above with reference to FIG. 13, where the signals and/or data are indicative of IP address and/or namespace (such as in a structured data entry 1100), a request (such as request 1200 or 1300), and/or content (such as Content Object).

Figure 13:
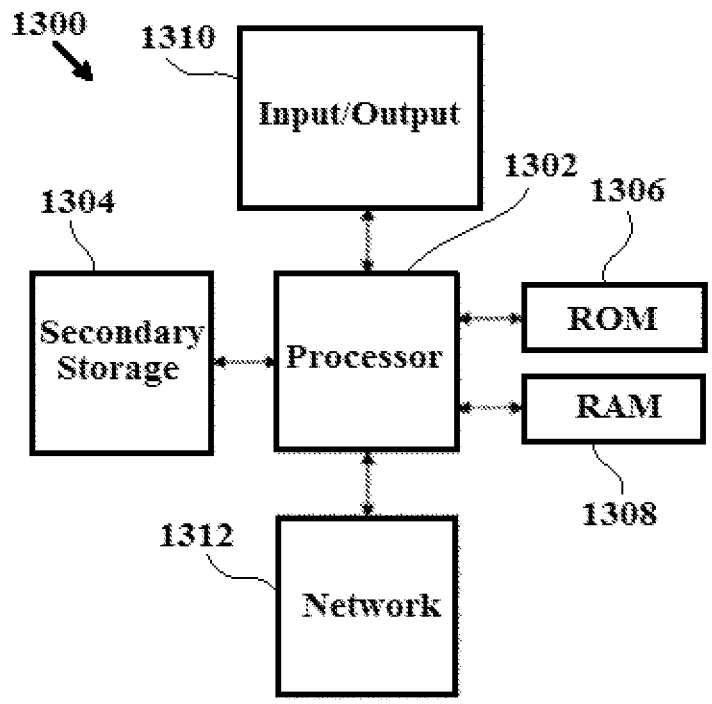
FIG. 13 illustrates in a generalized block diagram of a network component.

FIG. 13 illustrates a typical, general-purpose network component 1300 suitable for implementing one or more embodiments of the components disclosed herein. The network components described above may be implemented on any general-purpose network component, such as a computer or network component with sufficient processing power, memory resources, and network throughput capability to handle the necessary workload placed upon it. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

It should be understood that servers, routers, and/or any or all of the devices within consumer and/or producer domains as described herein can be configured to comprise a registration, routing and resolution logic including computer-readable non-transitory media storing computer readable instructions and one or more processors couple to said memory, and when executing said computer readable instruction configured to perform method steps and operations described in the disclosure with reference to FIGS. 1 to 13. The computer-readable non-transitory media includes all types of computer readable media, including magnetic storage media, optical storage media, flash media and solid state storage media.

It should be further understood that software including one or more computer-executable instructions that facilitate processing and operations as described above with reference to any one or all of steps, such as S1001 to S1008, as described above with reference to any or all FIGS. 1 to 13 of the disclosure can be installed in and sold with one or more servers and/or one or more routers and/or one or more devices within consumer and/or producer domains consistent with the disclosure. Alternatively the software can be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

The above-presented description and figures are intended by way of example only and are not intended to limit the illustrative embodiments in any way except as set forth in the appended claims. It is particularly noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments, but may be modified within the scope of appended claims, along with their full scope of equivalents.

What is claimed is:

1. A device for information-centric networking within internet protocol networking, comprising:
   a memory storing computer readable instructions; and
   one or more processors coupled to the memory, the one or more processors configured to execute the computer readable instructions to:
   perform operations in an architecture having a producer domain and a consumer domain, the producer domain being separate from the consumer domain, with the producer domain including a producer, one or more routers, and one or more producer domain servers, the operations including operations to:
   assign, as part of a registration, a namespace of the producer to an IP address of a first router residing within the producer domain of the producer;
   store, as part of the registration to maintain reachability of the producer, a structured data in a registration entry in a memory of one of the producer domain servers disposed in the producer domain, the structured data comprising the namespace, the IP address of the first router, and a producer address of the producer; and
   distribute to the first router a mapping of the producer address to the namespace of the producer based on the structured data;
   wherein, if a consumer request for content from a consumer does not include the producer address, the one or more processors executing the computer readable instructions are further configured to:
   set a destination address of the consumer request to an IP address of a second router;
   if the second router has the mapping, set the destination address to the producer address based on the mapping;
   if the second router does not have the mapping, set the destination address based on the structured data stored in the memory disposed in the producer domain, and distribute the mapping to the second router;
   forward the consumer request to an address corresponding to the IP address of the first router based on the mapping; and
   return the content to the consumer or the second router from the first router or the producer.

2. The device of claim 1, wherein the one or more processors executing the computer readable instructions are further configured to translate a content identifier comprising the namespace to a translated IP address.

3. The device of claim 2, wherein the translated IP address comprises an information-centric networking identifier, and an identifier of content.

4. The device of claim 3, wherein the identifier of the content is derived by a cryptographic hashing function.

5. The device of claim 3, wherein
   the information-centric networking identifier is a 32-bit identifier; and
   the identifier of the content is a 96-bit identifier.

6. The device of claim 3, wherein the translated IP address further comprises an identifier of the producer.

7. The device of claim 6, wherein
   the information-centric networking identifier is a 32-bit identifier or 24-bit identifier;
   the identifier of the producer is a 48-bit identifier; and
   the identifier of the content is a 48-bit identifier.

8. The device of claim 6, wherein
   the information-centric networking identifier is a 32-bit identifier;
   the identifier of the producer is a 32-bit identifier; and
   the identifier of the content is a 64-bit identifier.

9. The device of claim 1, wherein the one or more processors executing the computer readable instructions further are configured to:
   set a destination address of a consumer request for content from a consumer as an address comprising a routing extension header set to an IP address of a second third router;
   forward the consumer request to the IP address of the first router based on the mapping; and
   return the content to the consumer or the second third router from the first router or the producer.

10. The device of claim 1, wherein one or more processors executing the computer readable instructions are further configured to assign K-bit hash addresses to names of content using a cryptographic hash function.

11. The device of claim 9, wherein the consumer request forwarded to the IP address of the first router is cached by the first router and retrievable from the first router.

12. The device of claim 1, wherein the one or more processors executing the computer readable instructions are further configured to:
   set a destination address of a consumer request for content from a consumer as a destination address of the producer;
   forward the consumer request to the destination address of the producer based on the mapping; and
   return the content to the consumer from the first router or the producer.

13. A computer-implemented method for information-centric networking within internet protocol networking, comprising:
   performing operations in an architecture having a producer domain and a consumer domain, the producer domain being separate from the consumer domain, with the producer domain including a producer, one or more routers, and one or more producer domain servers, such that the operations include:
   assigning, as part of a registration, a namespace of the producer to an IP address of a first router residing within the producer domain of the producer;
   storing, as part of the registration to maintain reachability of the producer, a structured data in a registration entry in a memory of one of the producer domain servers disposed in the producer domain, the structured data comprising the namespace, the IP address of the first router, and a producer address of the producer;
   distributing to the first router a mapping of the producer address to the namespace of the producer based on the structured data;

setting a destination address of a consumer request, from a consumer, for content to an IP address of a second router if the second router has the mapping, setting the destination address the producer address based on the mapping;

if the second router does not have the mapping, setting the destination address based on the structured data stored in the memory, and distributing the mapping to the second router;

forwarding the consumer request to an address corresponding to the IP address of the first router based on the mapping; and returning the content to the consumer or the second router from the first router or the producer.

14. The method of claim 13, further comprising translating a content identifier comprising the namespace to a translated IP address.

15. The method of claim 14, wherein the translated IP address comprises an information-centric networking identifier, and an identifier of content.

16. The method of claim 15, wherein the identifier of the content is derived by a cryptographic hashing function.

17. The method of claim 15, wherein
the information-centric networking identifier is a 32-bit identifier; and
the identifier of the content is a 96-bit identifier.

18. The method of claim 15, wherein the translated IP address further comprises an identifier of the producer.

19. The method of claim 18, wherein
the information-centric networking identifier is a 32-bit identifier or 24-bit identifier;
the identifier of the producer is a 48-bit identifier; and
the identifier of the content is a 48-bit identifier.

20. The method of claim 18, wherein
the information-centric networking identifier is a 32-bit identifier;
the identifier of the producer is a 32-bit identifier; and
the identifier of the content is a 64-bit identifier.

21. The method of claim 13, further comprising
caching a consumer request forwarded to the IP address of the first router at the first router for retrieval from the first router.

22. The method of claim 13, further comprising
assigning K-bit hash addresses to names of content using a cryptographic hash function.

23. The method of claim 13, further comprising:

setting a destination address of a consumer request for content from a consumer as an address comprising a routing extension header set to an IP address of a third router;

forwarding the consumer request to the IP address of the first router based on the mapping; and returning the content to the consumer or the second third router from the first router or the producer.

24. The method of claim 13, further comprising:

setting a destination address of a consumer request, from a consumer, for content as a destination address of the producer;

forwarding the consumer request to the destination address of the producer based on the mapping; and returning the content to the consumer from the first router or the producer.

* * * * *

UNITED STATES PATENT AND TRADEMARK OFFICE
CERTIFICATE OF CORRECTION

PATENT NO. : 11,102,118 B2
APPLICATION NO. : 15/928575
DATED : August 24, 2021
INVENTOR(S) : Azgin et al.

It is certified that error appears in the above-identified patent and that said Letters Patent is hereby corrected as shown below:

In the Claims

In Column 20, Line 24, in Claim 9, before "third", delete "second"

In Column 20, Line 28, in Claim 9, before "third", delete "second"

In Column 22, Line 21, in Claim 23, before "third", delete "second"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*